United States Patent Office 3,454,700
Patented July 8, 1969

3,454,700
METHODS FOR STABILIZING PESTICIDAL COMPOSITIONS OF 2 - ALKOXYCARBONYLAMINO-BENZIMIDAZOLECARBOXYLIC ESTERS
Archibald M. Hyson, Newark, Del., assignor to E. I. du Pont de Nemours and Company, Wilmington, Del., a corporation of Delaware
No Drawing. Continuation-in-part of application Ser. No. 547,741, May 6, 1966. This application Apr. 11, 1967, Ser. No. 629,908
Int. Cl. A01m 9/22
U.S. Cl. 424—273     3 Claims

ABSTRACT OF THE DISCLOSURE

A pesticidal composition of an active ingredient of the formula

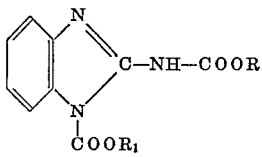

where R and $R_1$ can be alkyl of 1 through 4 carbons with a stabilizing amount of an acidic material, i.e., an acidic, inorganic diluent, an ion exchange resin in its acid form, or an acidic material having a water solubility greater than 0.2%.

CROSS REFERENCE TO RELATED APPLICATIONS

This application is a continuation-in-part application of my copending application Ser. No. 547,741, filed May 6, 1966, now abandoned.

BACKGROUND OF THE INVENTION

This invention relates to pesticidal compositions and more particularly to pesticidal compositions of 2-alkoxy-carbonylaminobenzimidazolecarboxylic esters.

The compounds, represented by the following formula:

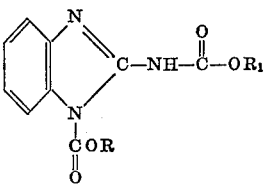

or its tautomeric form

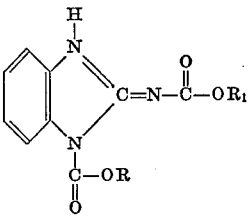

wherein R and $R_1$ are the same or different and are alkyl groups containing one through four carbon atoms, having outstanding fungicidal and mite ovidical activity. Particularly preferred for its pesticidal activity is 1-methoxycarbonyl-2-benzimidazolecarbamic acid, methyl ester.

However, in many types of pesticidal compositions these compounds have been found to decompose upon extended storage. The decomposition results in loss of the active ingredient as determined by chemical assay methods. The decomposition also results in the loss of the desirable physical and application properties of the formulation.

BRIEF SUMMARY OF THE INVENTION

I have discovered that stable, pesticidal compositions containing the above active compounds can be prepared by incorporating into the composition certain acidic materials in intimate contact with the active materials in the dry, powdered form. An important aspect is that the compositions must be substantially dry, i.e., the water content must be no greater than approximately 3% by weight and preferably below 1%.

The amount of acidic material incorporated is such that if the composition is in water at a concentration of 20% by weight, the pH of the finished mixture is within the range of 2.5 to 7.

Throughout the specification when referring to pH of the compositions or of the stabilizing acidic ingredients to be used, the measurements are made by preparing a mixture of 4 parts of distilled water plus 1 part of solids and determining the pH using a glass-calomel electrode. For uniformity the instrument is calibrated at pH 7.

Pesticidal compositions prepared in accordance with this invention show greatly improved stability in storage, compared to conventional formulations. Under many storage conditions there is essentially no, or insignificant, loss of the active ingredient, and no deterioration of physical properties.

The improved stability of the compositions of the invention can be indicated by the following simple test. The active ingredients above are quite soluble in methylene chloride or chloroform while the decomposition products are quite insoluble in the same solvents. Extraction with these solvents before and after aging gives a simple measure of the extent of the decomposition.

The stabilized dry compositions of the invention include agricultural formulations such as water-dispersible powders, oil-dispersible powders, dusts, granules, and pellets, and high-strength compositions or concentrates suitable for further formulation. In all instances it is important that the active ingredient, the stabilizing additives, and the other formulating ingredients be brought into intimate contact, for example by blending or grinding, possibly in the temporary presence of water, which should then be removed at the conclusion of manufacturing the formulation.

DETAILED DESCRIPTION OF THE INVENTION

The active ingredients of the compositions of the invention can be prepared by several routes. In one method, initially an alkyl ester of benzimidazole-2-carbamic acid is prepared by the following three step synthesis. Dimethyl sulfate is reacted with thiourea in the presence of a small amount of water to form 2-methyl thiopseudourea sulfate. This in turn is reacted with an alkyl chloroformate and sodium hydroxide to form a 2-methyl thiopseudourea-carboxylic acid, alkyl ester. Finally, the ester is reacted with an o-phenylenedimaine to form a benzimidazole-2-carbamic acid, alkyl ester. Specific details for carrying out this reaction may be found in U.S. Patent 3,010,968 and the preparation disclosure of that patent is incorporated herein by reference.

The dialkyl esters are then prepared from the above alkyl esters of benzimidazole-2-carbamic acid by the method set forth in U.S. Patent 2,933,504. Other methods of preparing the active ingredients are set forth in U.S. Patent 2,933,504 and those methods are incorporated herein by reference.

Normally, the active ingredient comprises 1 to 95% by weight of the composition, and the amount will vary depending upon the manner in which the composition is to be applied.

The stabilization of the active ingredient is accomplished by including in the pesticidal compositions, one or more members of the following groups of acidic materials:

(a) a water insoluble, acidic, inorganic diluent having a pH of 2.5 to 4.5,
(b) an acidic material having a water solubility greater than 0.2% and a pH of less than 6.0,
(c) an ion exchange resin in its acid form having a pH of less than 6, or
(d) mixtures thereof.

Examples of the water insoluble acidic inorganic diluents of group (a) are Bancroft clay, which is an acidic kaolinite having a pH of 3.0, and acidic aluminum silicate pigments. Other examples are conventional pesticide diluents such as kaolinites, bentonites, other clays, diatomaceous earth, fine silicas, and similar materials, all of which have been rendered acidic by washing with acid solutions. These materials can be prepared by dissolving in water many of the commonly available acids such as sulfuric acid, hydrochloric acid, citric acid, or acid salts such as $NaH_2PO_4$, $NaHSO_4$, and treating the diluents with such acidic solutions, subsequently washing out excess acid, and drying.

The water soluble acidic materials of group (b) are dry solids and include such materials as citric acid, hydroxyacetic acid, boric acid, aluminum acetate, salicyclic acid, benzoic acid, sulfamic acid and tannic acid. Since these agents are to exert their protective action in a dry, particulate composition, they should be finely divided and intimately mixed with the active ingredient by careful grinding and blending.

With respect to the pH for the acidic inorganic diluents and the water soluble acidic materials, it is to be understood that the pH involved is that of a 20% concentration of the acidic material dissolved or mixed in water.

The acidic ion exchange resins of group (c) include the strong acid resins such as sulfonated styrene and divinyl benzene, or weaker acid resins such as the polystyrene carboxylic types, e.g., "Rexyn" RG 51 (H). Similarly, intimate blending with the active ingredient is also required of these materials for optimum performance.

The amounts of the one or more of these additives in the compositions of this invention depend not only upon the nature of the additive (such as their acid strength and their ease of grinding to fine particle size), but also upon the other ingredients present in the formulation. These other ingredients are chosen to obtain adequate application characteristics to make the use of the active ingredient effective and convenient.

Generally when the water-soluble acidic materials or the ion exchange resins are used, they will be present in the range of 0.1 to 10% by weight of the composition. The specific concentration of the acidic material will depend upon the pH and the molecular weight of the material and the physical mixing problems involved. When the water insoluble acidic clays are used, they will range from 5 to 95% of the finished composition, with a preferred range being from 10 to 40%.

When the proper amount of stabilizing additive has been incorporated, the finished composition will have a pH range from 2.5 to 7. If the pH is higher, the stabilizing action is usually lost. If the pH is higher, the stabilizing action is usually lost. If the pH is lower, it is difficult to obtain good handling and application characteristics, particularly for the water-dispersible or oil-dispersible powders. Further, the high level of acidity may itself lead to instability of the active ingredient.

In addition to the active ingredient and the stabilizing acidic clays, ion exchange resins, or water-soluble acidic materials, the compositions of this invention may contain other ingredients to obtain good application properties. These ingredients usually comprise carrier or conditioning agents such as inert mineral diluents, surface-active agents, corrosion inhibitors, adhesives and the like. Useful conditioning agents, commonly referred to as pesticidial adjuvants or modifiers are disclosed in U.S. Patent 2,933,504, and in copending application Ser. No. 548,069, filed May 6, 1966, now abandoned. The formulation disclosure found in these specifications is incorporated herein by reference. However, the use of large amounts of highly alkaline materials as extenders is not desirable since they could raise the pH of the composition.

The compositions of this invention are prepared for ready and efficient application using conventional applicator equipment, by compounding the active ingredient and acidic material with suitable adjuvants by mixing, grinding, stirring or other conventional processes. The only requirement is that the method used results in intimate contact between the acidic material and the active ingredient.

The compositions can then be applied in the manner generally used for the active ingredient. In this respect, the application disclosure of U.S. Patent 2,933,504, and copending application Ser. No. 548,069, filed May 6, 1966 is incorporated herein by reference.

When the active ingredients of the prior formula are applied, their activity can be enhanced by using certain adjuvants, for example, in the water in which the benzimidazole fungicides are dispersed. These adjuvants can be surface active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides,
diphenyl sulfonate derivatives,
ethoxylated alcohols,
ethoxylated alkylphenols,
ethoxylated fatty acids,
ethoxylated fatty esters and oils,
polyethylene oxide polypropylene oxide combinations,
alkylsulfonates,
fluorocarbon surfactants,
glycerol esters,
ethoxylated alcohol sulfates,
glycol esters,
isethionates,
sulfated ethoxylated alkylphenols,
lanolin derivatives,
lecithin and lecithin derivatives,
alkanol amides,
phosphate derivatives,
monoglycerides and derivatives,
quaternaries,
sorbitan and sorbitol derivatives,
sulfosuccinates,
alcohol sulfates,
sulfated fatty esters,
sulfated and sulfonated oils and fatty acids,
alkyl benzene sulfonates,
imidazolines,
taurates,
ethhoxylated mercaptans,
ethoxylated amines and amides,
modified phthalic glycerol alkyl resins, and
similar materials.

The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the active ingredient is not known, the effect is, nevertheless, startling, and it is possible that these addtives improve the penetration into the plant or translocation throughout the plant of the fungicides.

Preferred surface active agents to improve the fungicidal and mite ovicidal activity of the active ingredients are products such as dioctyl sodium sulfosuccinates ("Aerosol" OT and "Aerosol" OT–B),
blends of aromatic sulfonates and ethylene oxide derivatives ("Agrimul" GM, "Agrimul" A–100, "Agrimul" N–100, "Emcol" H50A, "Emcol" H53),
polyoxyethylene sorbitol oleate/laurate ("Atlox" 1045A),
sodium lauryl sulfate ("Duponol" ME),
polyoxyethylated vegetable oils ("Emulphor" EL719),
lecithin derivatives ("Emultex" R),
acidic complex organic phosphate esters ("Gafac" RE–610, "Victawet"),
aliphatic amide alkyl sulfonates ("Hyfoam" Base LL),
oleic acid esters of sodium isethionate ("Igepon" AP78),
sodium N-methyl-N-oleoyl taurate ("Igepon" T77),
sodium salt of sulfated lauryl and myristyl colamide ("Intramine" Y),
polyethylene glycol 400 oleic acid ester ("Nonisol" 210),
sodium dodecylbenzene sulfonate ("Sul-Fon-Ate" AA 10, "Ultrawet" K),
polyoxyethylene ethers with long-chain alcohols ("Surfonic" LR 30, "Alfonic" 1012–6, "Brij" 30, "Tergitol" TMN),
ethylene oxide condensates with propylene oxide/ethylene diamine condensates ("Tetronic" 504),
polyhydric alcohol esters ("Trem" 014),
modified phthalic glycerol alkyd resins ("Triton" B 1956),
quaternaries ("Zelec" DP),
alkylphenol ethylene oxide condensates ("Dowfax" 9N4, "Dowfax" 9N10, "Hyonic" 9510, "Tergitol")
and the like.

The examples given in parentheses are illustrative and do not exclude other unnamed commercial products. Examples of other surface active agents in each of these several categories are listed in "Detergents and Emulsifiers," 1965 Annual, or 1966 Annual, published by John W. McCutcheon Inc., 236 Mt. Kemble Ave., Morristown, N.J.

Preferred oils include spray oils such as "Orchex" 796 made emulsifiable with "Triton" X–45, castor oil made emulsifiable with "Triton" X–114, corn oil made emulsifiable with "Triton" X–114, Volck Oil #70, Sunoco Oil No. 7E and similar nonphytotoxic spray oils of vegetable, animal or mineral origin.

Other surface active agents that can be used include betaines, alkyl naphthalene sulfonates, condensed naphthalene sulfonates, lignin derivatives, protein derivatives, salicylanilides, sarcosines, petroleum sulfonates, and tertiary amine oxides.

The preferred rates for these surfactants when used in sprays is in the range from 10 to 25,000 parts per million of the spray fluid. More preferred rates are in the range of 30 to 7,500 parts per million and the most preferred rates are in the range of 100 to 2,500 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

The active ingredient and the oils, humectants, enzymes, carbohydrates, and acids useful to enhance the fungicidal and mite-ovicidal activity of these compounds can be brought together in any of the conventional ways, For example, the additive which will enhance activity can be mixed with the compositions of the invention when spray slurries are being prepared.

It will be readily understood by those skilled in the trade and in the light of the above teachings that the ratios of active ingredient compound to additives may vary widely. Thus, the additive may be present in such mixtures within the range of from 33 to 10,000 parts per 100 parts of the active ingredient and a range of ratios from 50 to 3500 per 100 parts of active is even more preferred.

In order that the invention can be better understood, the following examples are offered.

EXAMPLE 1

A pesticidal composition is prepared from the following ingredients in the proportions listed.

| | Percent |
|---|---|
| 1 - methoxycarbonyl - 2 - benzimidazolecarbamic acid, methyl ester | 70.00 |
| Sodium lauryl sulfate | 0.75 |
| Low viscosity methyl cellulose | 0.30 |
| Aluminum silicate pigment (pH 3.5) | 28.95 |

The above components are blended, then micropulverized until substantially all particles are below 30 microns. A 20% slurry of this composition a pH of 5.25.

When stored at 45° C. for 6 weeks there is no decomposition of the active ingredient as measured by loss in extractable solids. The physical properties such as wetting and dispersion remain unchanged, when compared with the newly formulated composition.

EXAMPLE 2

A wettable powder composition is prepared in the following proportions:

| | Percent |
|---|---|
| 1 - n - butoxycarbonyl - 2-benzimidazolecarbamic acid, methyl ester | 70.00 |
| Sodium lauryl sulfate | 0.50 |
| Oleic acid ester of sodium isethionate | 2.00 |
| Kaolinite clay (Bancroft clay—pH 3) | 27.50 |

These components are mixed and micropulverized in the same manner as in Example 1. The composition has a pH of 5.8 when tested in the prescribed manner. The product is stored at 45° C. for 6 weeks. At the end of this period the decomposition as measured by loss in extractable material is less than 5%. Comparable tests with a nonacidic attapulgite clay (pH 7.5) replacing Bancroft clay shows 30–40% loss.

EXAMPLE 3

A composition is prepared in the following proportions:

| | Percent |
|---|---|
| 1 - isobutoxycarbonyl - 2 - benzimidazolecarbamic acid, isobutyl ester | 70 |
| Alkyl naphthalene sulfonic acid, sodium salt | 1 |
| Sodium lignin sulfonate | 2 |
| Diatomaceous silica (pH 5.9–6.4) | 22 |
| Boric acid powder (pH 3.68) | 5 |

The above components are mixed and micropulverized until substantially all particles are less than 50 microns. The composition has a pH of 6.39. The composition shows no decrease in extractable solids after prolonged aging at 45° C.

Boric acid may be replaced by citric acid without appreciable change in stability in the above example, though the pH will be lower.

EXAMPLE 4

A dust composition is prepared in the following proportions:

| | Percent |
|---|---|
| 1 - ethoxycarbonyl - 2 - benzimidazolecarbamic acid, methyl ester | 20 |
| Pyrophyllite | 40 |
| Aluminum silicate pigments (pH 3.5) | 40 |

The active compound is first blended with the aluminum silicate pigment and micropulverized, then the mixture is blended with the pyrophyllite to yield a dust suitable for dust application with conventional equipment.

EXAMPLE 5

A pellet composition is prepared in the folloming proportions:

| | Percent |
|---|---|
| 1 - methoxycarbonyl - 2 - benzimidazolecarbamic acid, methyl ester | 10 |
| Kaolinite (pH 3.0–4.0) | 87 |
| Low Viscosity methylcellulose | 3 |

The above components are blended and micropulverized and then moistened with 18–20% water, pug milled and extruded. The extrusions are cut to form small pellets or granules which are then dried. These pellets can be used for application to the soil. The pellets when slurried in water until disintegrated give a pH of 5.7.

EXAMPLE 6

A dust composition is prepared in the following proportions:

| | Percent |
|---|---|
| 1 - methoxycarbonyl - 2 - benzimidazolecarbamic acid, n-butyl ester | 20 |
| Sericite dust (pH 7) | 75 |
| $NaH_2PO_4$ | 5 |

The $NaH_2PO_4$ is first dissolved in water, then blended with the sericite and the mixture dried. The acidified sericite is then blended with the active material and the mixture micropulverized to yield a dense, stable dust composition having a pH of 6.3.

EXAMPLE 7

| | Percent |
|---|---|
| 1 - methoxycarbonyl - 2 - benzimidazolecarbamic acid, methyl ester | 75 |
| Sodium lauryl sulfate | 1 |
| Oleic acid ester of sodium isethionate | 2 |
| Diatomaceous silica (pH 5.9–6.4) | 17 |
| Cation exchange resin "Rexyn" RG 51 (H) | 5 |

The above components are blended and micropulverized as described in Example 1. No loss in active material occurs when this composition is stored six weeks at 45° C.

EXAMPLE 8

The composition of Example 1 is added to water in an amount to provide 30 p.p.m. of the active 1-methoxycarbonyl-2-benzimidazolecarbamic acid, methyl ester in the final spray suspension. "Trem" 014 (polyhydric alcohol esters) is added to the spray suspension in an amount to provide 250 p.p.m. "Trem" 014 employed as a surfactant and penetrant to improve the performance of the active ingredient.

Apple trees are sprayed on a normal protective schedule (6 to 13 times during the growing season) with a suspension made up as described above just prior to each application. Trees thus treated remain free of disease and mites throughout the growing season. Similar and adjacent apple trees left untreated, on the other hand, are heavily damaged by apple scab, powdery mildew and mites.

Instead of "Tream" 014, the active ingredients of Examples 1 through 7 can be formulated with any of the preferred surface active agents and spray oils previously set forth to improve their performance as fungicides or mite ovicides.

I claim:

1. A method of preparing a stabilized pesticidal composition comprising, in either order, mixing a compound of the formula:

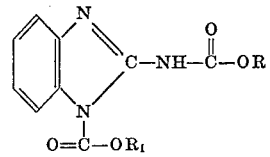

wherein R and $R_1$ are the same or different and are alkyl of 1 through 4 carbon atoms with a stabilizing amount of an acidic material selected from the group consisting of water insoluble, inorganic diluents having a pH of from 2.5 to 4.5; acidic materials having a water solubility greater than 0.2% and a pH less than 6; ion exchange resins in the acid form having a pH of less than 6; and mixtures thereof and grinding to obtain a substantially dry, stable, pesticidal composition.

2. The method of claim 1 wherein the amount of acidic material is such that a 20% concentration of the mixture of claim 1 in water has a pH of from 2.5 to 7.0.

3. The method of claim 1 wherein in addition 33 to 10,000 parts per 100 parts of said compound of the formula, of an adjuvant selected from the group consisting of surface active agents, spray oils, humectants, enzymes, carbohydrates, and organic acids is added to the composition.

References Cited

UNITED STATES PATENTS

| 2,933,502 | 4/1960 | Klopping | 167—330 |
| 2,933,504 | 4/1960 | Klopping | 167—330 |
| 3,010,968 | 11/1961 | Loux | 260—309.2 |

OTHER REFERENCES

Pesticide Index, Frear (1963), p. 40.

ALBERT T. MEYERS, *Primary Examiner.*

S. J. FRIEDMAN, *Assistant Examiner.*